US009106272B2

(12) United States Patent
Marcovecchio et al.

(10) Patent No.: US 9,106,272 B2
(45) Date of Patent: *Aug. 11, 2015

(54) MOBILE COMMUNICATIONS DEVICE PROVIDING SECURE ELEMENT DATA WIPING FEATURES AND RELATED METHODS

(75) Inventors: Vincenzo Kazimierz Marcovecchio, Ottawa (CA); Ravi Singh, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,836

(22) Filed: Sep. 12, 2012

(65) Prior Publication Data

US 2013/0111598 A1 May 2, 2013

Related U.S. Application Data

(60) Provisional application No. 61/554,931, filed on Nov. 2, 2011, provisional application No. 61/563,319, filed on Nov. 23, 2011.

(51) Int. Cl.
*G06F 17/30* (2006.01)
*H04B 5/00* (2006.01)
*H04W 4/00* (2009.01)
*H04L 29/08* (2006.01)
(Continued)

(52) U.S. Cl.
CPC .............. *H04B 5/0031* (2013.01); *H04L 67/34* (2013.01); *H04W 4/001* (2013.01); *H04M 1/7253* (2013.01); *H04M 1/72525* (2013.01); *H04M 2250/04* (2013.01); *H04W 4/008* (2013.01); *H04W 12/08* (2013.01)

(58) Field of Classification Search
CPC ..... H04B 5/0031; H04L 67/34; H04W 4/001; H04W 12/08; H04W 12/008; H04M 1/72525; H04M 1/7253; H04M 2250/04
See application file for complete search history.

(56) References Cited

U.S. PATENT DOCUMENTS

2005/0222918 A1  10/2005  Vanska et al.
2008/0132167 A1*  6/2008  Bent et al. ................... 455/41.2
(Continued)

FOREIGN PATENT DOCUMENTS

EP       2211480       7/2010

OTHER PUBLICATIONS

U.S. Appl. No. 13/611,886, filed Sep. 12, 2012.
(Continued)

*Primary Examiner* — Michael S McNally
*Assistant Examiner* — Khoi Le
(74) *Attorney, Agent, or Firm* — Steven M. Greenberg, Esq.; Donna Flores, Esq.; CRGO Law

(57) ABSTRACT

A mobile communications device may include a near field communications (NFC) device, an input device configured to generate a memory wipe command, a memory, and a memory controller coupled with the NFC device, the input device, and the memory. The memory controller may be configured to receive secure data from a provisioning server and store the secure data into the memory, receive wiping instruction data from the provisioning server and store the wiping instruction data into the memory for wiping the secure data from the memory, and wipe the secure data from the memory without an over-the-air (OTA) connection to the provisioning server based upon the memory wipe command and the wiping instruction data stored in the memory.

20 Claims, 5 Drawing Sheets

(51) Int. Cl.
*H04M 1/725* (2006.01)
*H04W 12/08* (2009.01)

(56) References Cited

U.S. PATENT DOCUMENTS

| | | | |
|---|---|---|---|
| 2008/0155258 A1* | 6/2008 | Obereiner et al. | 713/168 |
| 2008/0178300 A1* | 7/2008 | Brown et al. | 726/29 |
| 2009/0203355 A1* | 8/2009 | Clark | 455/411 |
| 2010/0088188 A1* | 4/2010 | Kumar et al. | 705/17 |
| 2010/0145854 A1* | 6/2010 | Messerges et al. | 705/44 |
| 2010/0190437 A1* | 7/2010 | Buhot | 455/41.1 |
| 2010/0198728 A1* | 8/2010 | Aabye et al. | 705/44 |
| 2011/0183611 A1* | 7/2011 | Wane | 455/41.1 |
| 2013/0109308 A1* | 5/2013 | Singh et al. | 455/41.1 |

OTHER PUBLICATIONS

Ericsson, "The role of SIM OTA and the Mobile Operator in the NFC environment", Apr. 2009, retrieved from the internet, http://www.paymentscardsandmobile.com/research/reports/SIM-OTA-Mobile-Operator-role-NFC.pdf, pp. 1-12.

* cited by examiner

MOBILE COMMUNICATIONS DEVICE PROVIDING SECURE ELEMENT DATA WIPING FEATURES AND RELATED METHODS

RELATED APPLICATIONS

This application is based upon prior filed provisional application Ser. No. 61/563,319 filed Nov. 23, 2011 and provisional application Ser. No. 61/554,931 filed Nov. 2, 2011; the disclosures of which are incorporated herein by reference in their entirety.

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile communications devices. This short-range high frequency wireless communications technology exchanges data between devices over a short distance, such as only a few centimeters.

DETAILED DESCRIPTION

Figure 1:
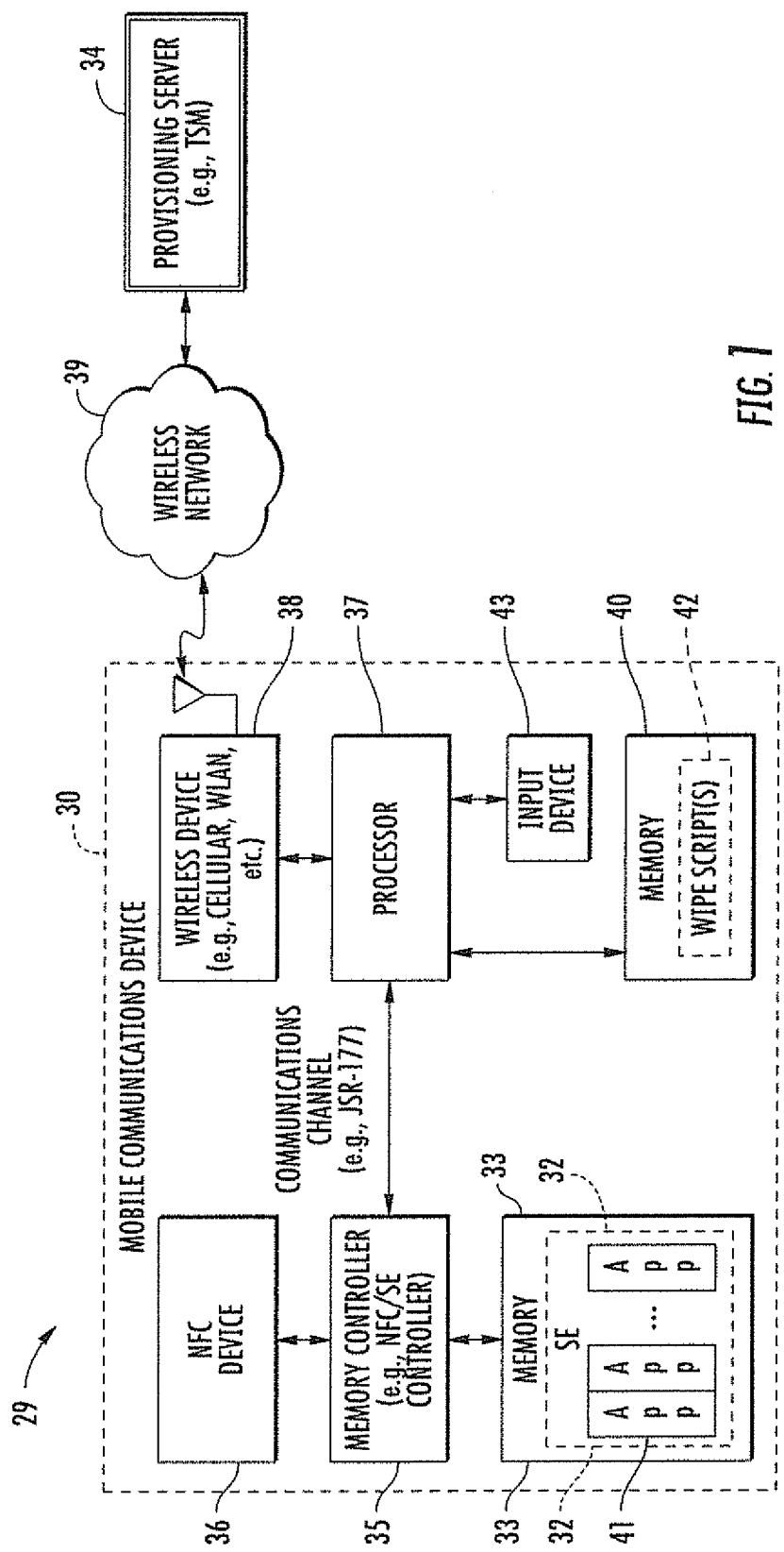
FIG. 1 is a schematic block diagram of a mobile communications device in accordance with an example embodiment.

The present description is made with reference to example embodiments. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Generally speaking, a mobile communications device is provided herein which may include a near field communications (NEC) device, an input device configured to generate a memory wipe command, a memory, and a memory controller coupled with the NEC device, the input device, and the memory. The memory controller may be capable of receiving secure data from a provisioning server and storing the secure data into the memory, receiving wiping instruction data from the provisioning server and storing the wiping instruction data into the memory for wiping the secure data from the memory, and wiping the secure data from the memory without an over-the-air (OTA) connection to the provisioning server based upon the memory wipe command and the wiping instruction data stored in the memory.

More particularly, the wiping instruction data may comprise at least one wiping instruction script. Moreover, the memory controller may be configured to provide a plurality of sequence count values, and the at least one wiping instruction script may comprise a plurality of wiping instruction scripts each having a respective different sequence count value associated therewith. Furthermore, the memory controller may be further configured to execute a respective wiping instruction script from among the plurality of wiping instruction scripts based upon a current sequence count value. The memory may be divided into a plurality of secure partitions, and the wiping instruction data may be stored in a given one of the secure partitions.

The provisioning server may comprise a trusted service manager (TSM) server. Additionally, the memory may comprise a secure element, and the memory controller may comprise a secure element controller. By way of example, the memory may comprise a SIM card, a eUICC, or a removable memory. Other example memories may include a SD card or an embedded memory.

A related communications method is for a mobile wireless communications device, such as the one described briefly above. The method may include receiving secure data from a provisioning server to the memory, receiving wiping instruction data from the provisioning server to the memory for wiping the secure data from the memory, and wiping the secure data from the memory without an over-the-air (OTA) connection to the provisioning server based upon the memory wipe command and the received wiping instruction data.

A related non-transitory computer-readable medium is for a mobile communications device, such as the one described briefly above. The non-transitory computer-readable medium may have computer-executable instructions for causing the mobile communications device to perform steps including receiving secure data from a provisioning server to the memory, receiving wiping instruction data from the provisioning server to the memory for wiping the secure data from the memory, and wiping the secure data from the memory without an over-the-air (OTA) connection to the provisioning server based upon the memory wipe command and the received wiping instruction data.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

Figure 3:
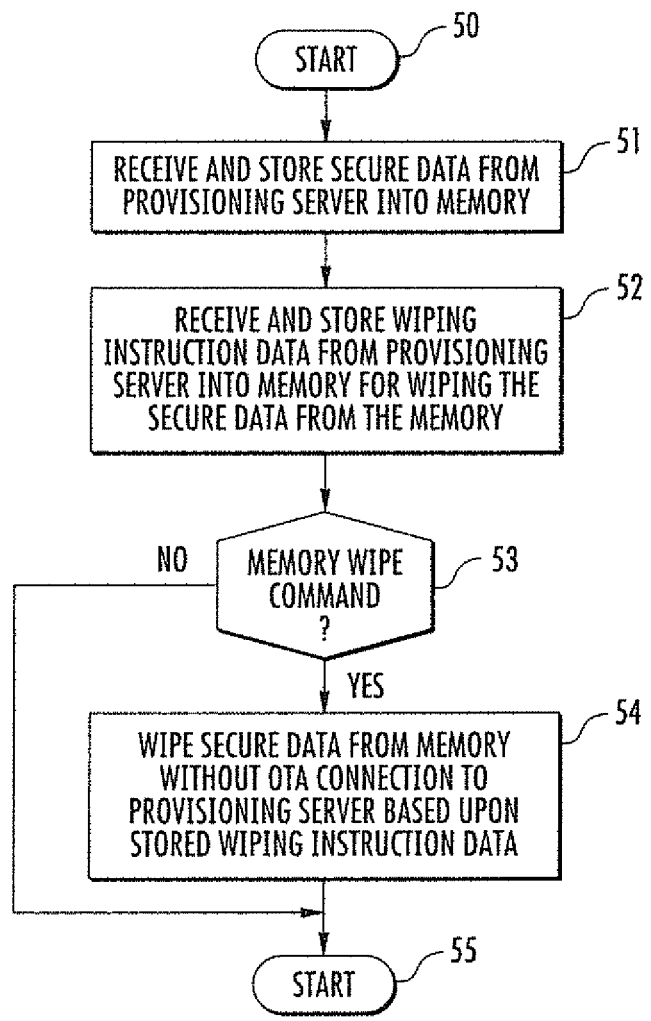
FIG. 3 is a flow diagram illustrating method aspects associated with the system of FIG. 1 or 2.

Referring initially to FIGS. 1 and 3, a communications system 29 and associated method aspects are first described.

NFC-enabled devices may be provisioned to initiate NFC transactions, such as payment or security transactions. This is sometimes referred to as a mobile or electronic wallet (e-wallet) configuration, allowing a mobile communication device 30 (also referred to as a "mobile device" herein) to be used similar to a credit card or security card that would ordinarily be carried in a wallet. For example, this may be done by provisioning a secure element (SE) 32 on a memory 33 of the mobile device 30 via a provisioning server 34 (which may be provided by a trusted service manager (TSM)) with secure data, including one or more secure applets 41 (Blocks 50-51). The memory 33 may comprise a Subscriber Identity Module (SIM) card, a removable memory (e.g., a secure digital (SD) card), a designated or embedded memory associated with the NFC circuitry (e.g., within an NFC chip set), an embedded UICC (eUICC), etc., for example.

Example mobile devices 30 may include portable or personal media players (e.g., music or MP3 players, video players, etc.), portable gaming devices, portable or mobile telephones, smartphones, portable computers such as tablet computers, digital cameras, etc. The mobile device 30 further illustratively includes a memory controller 35 coupled with the memory 33, such as a NFC secure element controller. Furthermore, a NFC device 36 (e.g., an NFC transceiver) and a processor 37 are also coupled with the memory controller 35. More particularly, the processor 37 may and the memory controller 35 may communicate via a designated communications channel, such as a JSR-177 channel, for example, although other suitable communications channels may be used in various embodiments.

The mobile device 30 further illustratively includes a wireless device 38, such as a cellular or wireless local area network (WLAN) transceiver, for example, coupled with the processor 37 for establishing an over-the-air (OTA) connection with the provisioning server 34 via a wireless network 39 (e.g., a cellular or WLAN network). One or more input devices 43 (e.g., keypad, touch screen, track ball, track pad, buttons, etc.) are also coupled with the processor 37, which may be used to provide a memory wipe command for causing the secure element 32 to be wiped, as will be discussed further below. The processor 37 or memory controller 35 may be implemented using a combination of hardware (e.g., microprocessor, memory, etc.) and software (e.g., a non-transitory computer-readable medium having computer-executable instructions), for example, to perform the various operations or functions described herein.

Normally, certain contents of the secure element 32 may only be modified by the provisioning server 34 (i.e., a TSM), as the TSM holds the issuer keys for the secure element. Both the secure element 32 and the TSM have knowledge of these issuer keys. Commands the TSM issues to the secure element 32 are signed using its knowledge of these keys, and the secure element verifies these commands before accepting them. The security domain established by these keys is also known as the Issuer Security Domain (ISD). These commands may involve the installation or deletion of content and applications or applets 41 on the secure element 32 (e.g., payment account applets, security or physical access applets, transportation access applets (e.g., subway cards, etc.)). Any given group of commands sent down during a single session are done within a "secure channel", which is a mutually-authenticated communication session.

However, this may be problematic in cases where the mobile device 30 needs to be wiped (and the contents of the secure element 32 similarly wiped or erased), when the mobile device has no over-the-air (OTA) connectivity to the provisioning server 34. This may happen in various situations, such as in facilities in which mobile devices are being repaired and refurbished for future purchase, customers who have removed a SIM card before they try to wipe the mobile device, etc.

In accordance with an example embodiment, the provisioning server 34 may send to the mobile device 30 wiping instruction data, or a wipe script, which may include a pre-calculated set of commands, or application protocol data units (APDUs), that may be used to wipe the secure element 32 without an OTA connection, at Block 52. An example embodiment will now be described with reference to a GlobalPlatform secure channel implementation, and the APDUs being transferred between the device and the TSM are ISO7816-4 conformant, although other suitable protocols and implementations may be used in different embodiments. In accordance with the example, the mobile device 30 and the provisioning server 34 have a way to communicate, such as a proxy application running on the mobile device 30 which sends and receives commands OTA to and from the provisioning server and relays them to the secure element 32 via the memory controller 35.

When establishing and communicating through a secure channel, the issuer security domain (ISD) keys as well as a sequence counter are used as an input to generate the session_mac, session_enc, and session_kek (signing, encryption, and further encryption) keys for the particular secure channel. For example, Session_key=function(issuer security domain key, sequence counter)

The session keys are then used to sign and encrypt APDUs for the secure channel. The sequence counter is provided by the secure element 32, and is incremented each time the secure element is accessed. A challenge/response mechanism may take place at the beginning of the secure channel establishment to prove that both sides are able to calculate the correct session key, given the sequence counter. At the end of each secure channel session, the sequence counter is incremented by the secure element 32, such that the session keys and APDUs from the previous secure channel are not re-used. Further information on GlobalPlatform secure channel implementations are provided in the GlobalPlatform Card Specification v2.1.1, and the GlobalPlatform Card Specification v2.2. Section 5.1.2.1 of the GlobalPlatform Card Specification v2.1.1 is reproduced below:

E.1.2.1 Explicit Secure Channel Initiation

The Secure Channel may be explicitly initiated by the off-card entity using the INITIALIZE UPDATE and EXTERNAL AUTHENTICATE commands. The Application may pass the APDU to the Security Domain using the appropriate API e.g. the processSecurity( ) method of a GlobalPlatform Java Card. The explicit Secure Channel initiation allows the off-card entity to instruct the card (see Appendix E.5.2—EXTERNAL AUTHENTICATE Command) as to what level of security is required for the current Secure Channel (integrity and/or confidentiality) and apply this level of security to all the subsequent messages exchanged between the card and the off-card entity until the end of the session. It also gives the off-card entity the possibility of selecting the Key Version Number to be used (see Appendix 5.5.1—INITIALIZE UPDATE Command).

Note: The explicit Secure Channel Session initiation also allows the card to inform the off-card entity what Secure Channel Protocol is supported, using the returned Secure Channel Protocol identifier. The Secure Channel is always initiated (see Appendix 5.5.1—INITIALIZE UPDATE Command) by the off-card entity by passing a "host" challenge (random data unique to this session) to the card. The card, on receipt of this challenge, generates its own "card" challenge (again random data unique to this session). The card, using its internal Sequence Counter and static keys, creates new secret session keys and generates a first cryptographic value (card cryptogram) using one of its newly created session keys (see Appendix 5.4.1—DES Session Keys). This card cryptogram along with the Sequence Counter, the card challenge, the Secure Channel Protocol identifier, and other data is transmitted back to the off-card entity. As the off-card entity should now have all the same information that the card used to generate the card cryptogram, it should be able to generate the same session keys and the same card cryptogram and by performing a comparison, it is able to authenticate the card. The off-card entity now uses a similar process to create a second cryptographic value (host cryptogram) to be passed back to the card (see Appendix 5.5.2—EXTERNAL AUTHENTICATE Command). As the card has all the same information that the host used to generate the host cryptogram, it should be able to generate the same cryptogram and, by performing a comparison, it is able to authenticate the off-card entity. The off-card entity also creates a MAC to be passed back to the card and verified by the card. The verified MAC is used by the card to create the Initial Chaining Vector for the verification of the subsequent C-MAC and/or RMAC. When the off-card entity is successfully authenticated, the card increments its internal Secure Channel Sequence Counter.

As such, suppose the sequence counter value is X. Before the provisioning server 34 starts any secure channel with the mobile device 30, it may send a wipe script to the mobile device (which may be integrity checked in some embodiments). The wipe script may be configured to expect that the sequence counter has a value of X+1, and it may include all of the requisite APDUs to wipe or delete some or all of the contents of the secure element 32. That is, the wipe script may include INITIALIZE_UPDATE, EXTERNAL AUTHENTICATE, and DELETE commands for each application (or a subset of the applications) installed on the secure element 32.

In some example embodiments, the device proxy may save the script in a persistent memory 40 accessible by the processor 37. Once this has been done, the proxy may then send the APDUs to the secure element 32 requested by the provisioning server 34. The device proxy may also scan the APDUs being sent to the secure element 32, and as soon as the proxy sees a successful response to an EXTERNAL AUTHENTICATE (meaning that a secure channel has been established between the provisioning server 34 and the mobile device 30 and that the sequence counter will have a value of X+1 for the next secure channel attempt), the device proxy may discard the previous wipe script and set the wipe script it just received as the most current one.

Accordingly, the above-described approach may advantageously allow for deleting of some or all of the contents of the secure element 32 by having the provisioning server 34 pre-compute or pre-determine appropriate wipe scripts for the secure element, and storing them on the memory 37. When the memory wipe command is received via the input device 43, the processor 37 may accordingly prompt the memory controller 35 to wipe some or all of the contents of the secure element 32 without having to establish an OTA connection with the provisioning server 34, at Blocks 53-54, which concludes the method illustrated in FIG. 3 (Block 55). By way of example, it may be desirable to wipe all of the applets 41 and associated data (e.g., identification numbers, account numbers, encryption data, etc.) from the secure element 32 during a wipe operation, but to leave the basic secure element operating applets, such as an applet that controls the secure element wiping operations, or a routing applet which controls communications with the secure element, for example. However, in some embodiments secure applets 41 may be selectively wiped, or the entire secure element 32 may be wiped if needed.

By having the TSM send a new wipe script before a secure channel is initiated, the mobile device 30 may have a valid wipe script to be executed or played against the next sequence counter value. In some embodiments, the mobile device 30 may discard older wipe scripts after it sees a successful EXTERNAL AUTHENTICATE command, meaning that older wipe scripts may no longer be played, and only the new wipe script may be played. When it is determined that it is time to wipe the secure element, the wipe script merely needs to be played. Playing of the wipe script may be initiated via the input device 43, through on-screen menu options, for example.

Figure 4:
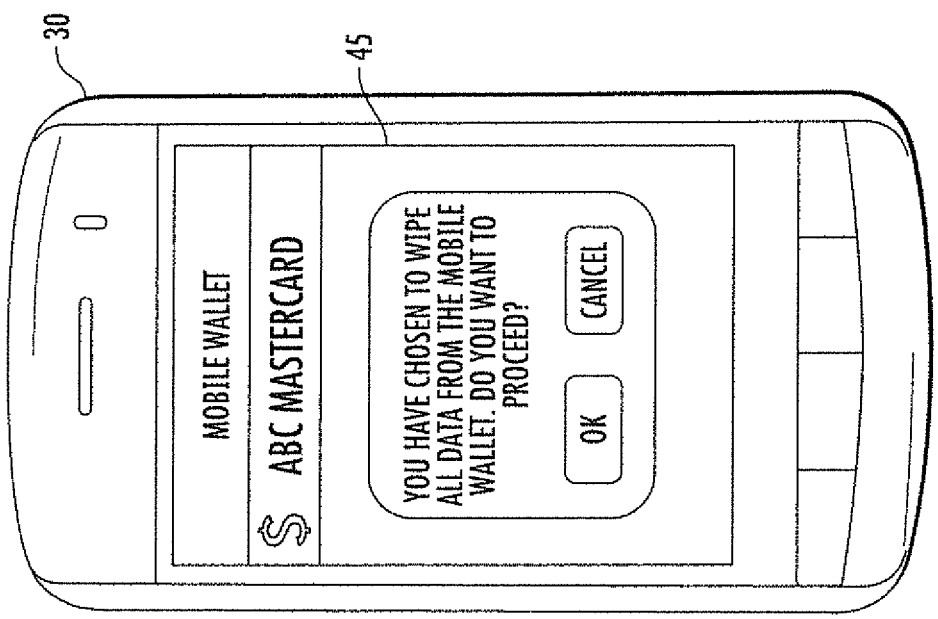
FIGS. 4 and 5 are front views of an example embodiment of the mobile communications device of FIG. 1 or 2 illustrating secure memory wiping operations.
Figure 5:
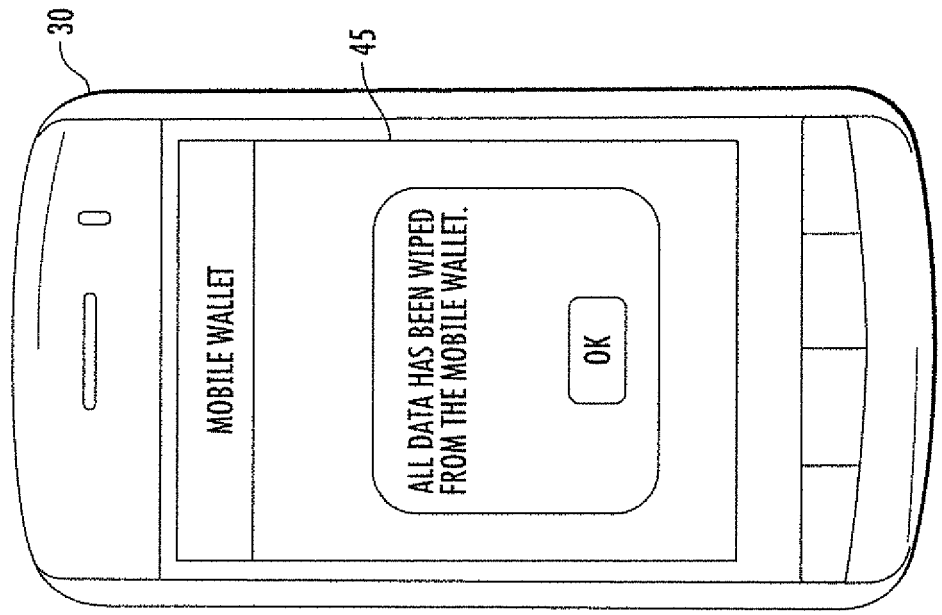

In the examples of FIGS. 4 and 5, the mobile device 30 illustratively includes a touch screen display 45 which also serves as an input device, although other display and input device configurations may be used in different embodiments. Upon selecting a menu option to wipe data from a mobile wallet application running on mobile device 32 (which serves as a graphical user interface for accessing the secure applets stared on the secure element 32), a confirmation prompt is provided on the display 45 (FIG. 4). The confirmation prompt requires the wipe operation to be confirmed (by pressing "OK"), at which point the processor may proceed to perform the above-described steps to play the wipe script and erase or wipe the secure element 32. Once the wipe operation is completed, a confirmation prompt may be provided on the display 45 to confirm that the secure data has been erased or wiped from the secure element 32 as requested. However, it should be noted that in some embodiments both the secure element 32 and the memory 40 may be wiped together as part of the same overall device wipe operation.

Figure 2:
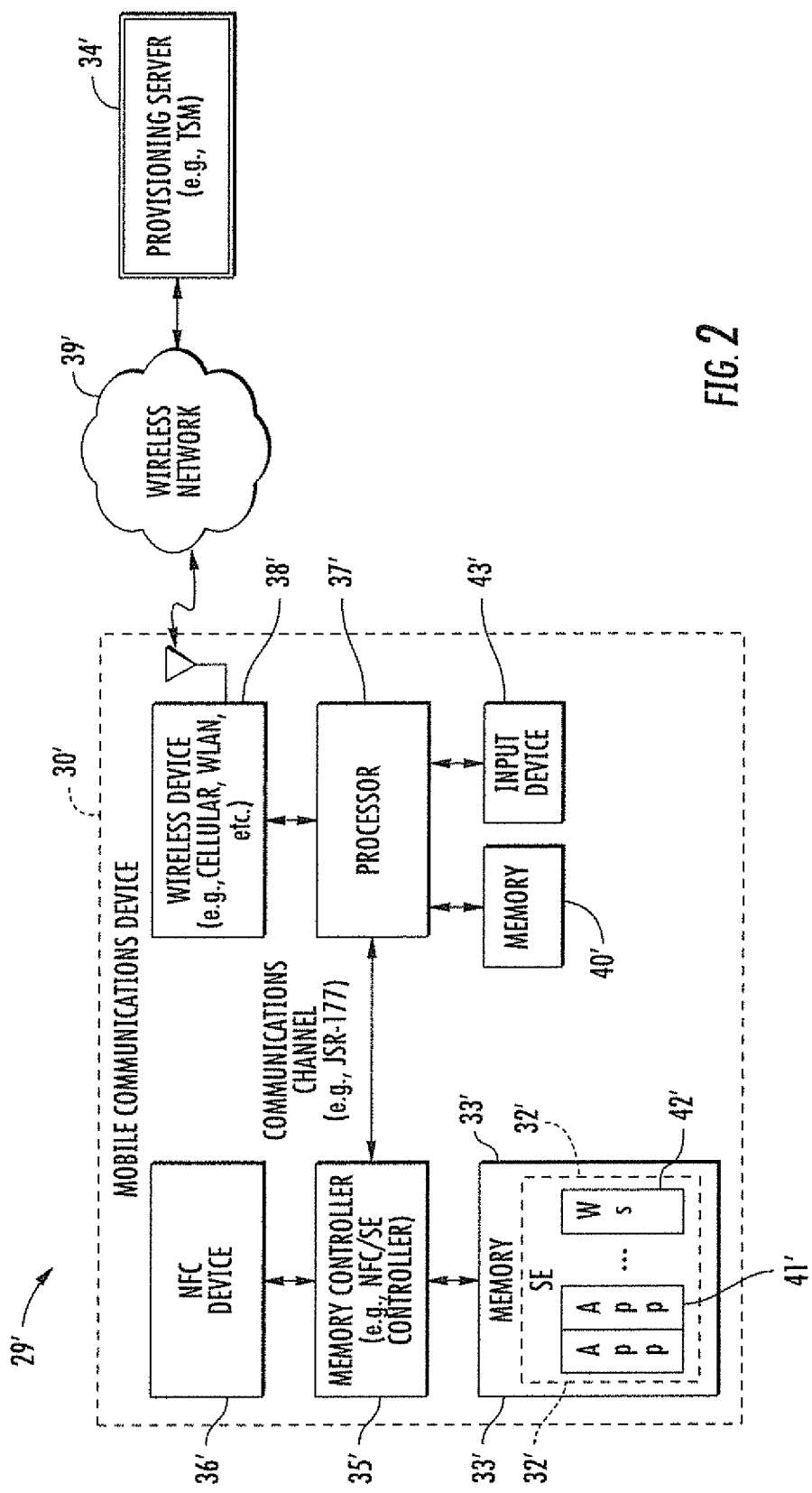
FIG. 2 is a schematic block diagram of an alternative embodiment of the mobile communications device of FIG. 1.

Referring additionally to FIG. 2, in accordance with another example embodiment, in some situations it may be advantageous to instead store one or more wipe scripts 42' in the secure element 32', as opposed to the memory 40'. This may help ensure that the wipe script(s) 42' stays intact as long as there is content on the secure element 32', regardless of what happens with the memory 40'. For example, if the mobile device 30' is being transferred to another user, the memory 40' may be wiped, or the memory 40' may be replaced while the mobile device 30' is being repaired, for example. In such cases, the wipe scripts 42' would no longer be available for wiping the secure element 32', meaning the secure element could not be wiped without an OTA connection to the provisioning server, which may not be available at that point.

As noted above, wiping of the secure element 32' may be included as part of an overall device wipe operation (such as when a user is trading in or transferring the mobile device 30' to another user). That is, selection of a device wipe operation by the user (e.g., though an on-screen menu selection) may advantageously cause the secure element 32' and the memory 40' to be wiped of secure or personal data as part of the same operation, although these wiping operations may be performed separately.

Another potential advantage of storing the wipe script(s) 42' in the secure element 32' is that this may help ensure that only the authorized owner of the secure element (i.e., the appropriate TSM) is able to provide the mobile device 30' with new wipe scripts. For example, if a malicious attacker were able to provide a fake wipe script to the memory 40', this attack may result in the secure element 32' wipe operations malfunctioning, and thus secure data being "left over" on the secure element 32' even when the memory 40' has been wiped.

A further consideration is that in some circumstances it may be desirable to store or maintain more than one wipe script at a time. More particularly, multiple wipe scripts may need to be stored (either on the secure element 32' or the memory 40') at a given time because it may not always be possible to predict what the ISD sequence counter value will be when the secure element needs to be wiped. As noted above, when a given transaction is completed with the secure element 32', the ISD sequence counter value is increased (e.g., from X to X+1). However, it is possible that an error condition may occur, such as when an OTA secure channel to the provisioning server 34' is lost due to poor signal strength, interference, network error, loss of power, etc. In such case, a new wipe script (corresponding to a count value of X+1) may have been downloaded to the secure element 32, but the session or transaction was not completed and thus the sequence count was not successfully increased to X+1. In such case, if only the most recent wipe script was stored (i.e., the X+1 wipe script), when a secure element 42 wipe is requested the current ISD count would be X, which would not correspond with the value associated with the X+1 wipe script, and the wipe operation may accordingly fail.

As such, to account for such error conditions, when the provisioning server 34' is about to open a secure channel with the mobile device 30' based on sequence counter value X, it may first ensure that the mobile device 30' has wipe scripts that are valid for respective different sequence count values, such as for sequence counter values X and X+1 in the present example. This may advantageously provide a consistent and reliable approach for ensuring that a valid wipe script is stored at all times, and for determining which wipe script is the appropriate one to use at a given time. That is, the memory controller 35' may be configured to execute a given wipe script 41' from the plurality of stored wipe scripts based upon the current sequence count value and the respective sequence count values associated with the plurality of wipe scripts.

In some embodiments, the wipe scripts 42' may be stored as part of a specialized applet on the secure element 42'. The applet may advantageously be placed in its own security domain or partition, and may be configured so that it only accepts applets over a secure channel, thus helping to ensure that only the TSM which owns the secure element 32' is able to configure the wipe scripts for that TSM. When the mobile device 30' needs to wipe the secure element 32' (e.g., a wipe command is received via the input device 43'), the processor 37' may communicate with the specialized applet (outside of a secure channel and without an OTA connection) to retrieve the appropriate wipe script, so that the APDUs that are located in the wipe script may be run.

Furthermore, the specialized applet on the secure element 32' may advantageously be configured for storage of multiple wipe scripts at the same time. Thus, when the provisioning server stores a wipe script 42' in the secure element 32', the wipe script is associated with the sequence counter for which the wipe script will be valid. When the mobile device 30' needs to wipe the secure element 32', prior to communicating with the specialized applet, the processor 37' may send an INITIALIZE UPDATE command to the memory controller 35', which provides the current sequence counter value from the secure element 32' in response to this command. Then, when the processor 37' requests a wipe script from the specialized applet, it includes the current sequence counter provided responsive to the INITIALIZE UPDATE command as a parameter to the wipe script request. As such, the specialized applet may return or provide the wipe script that corresponds to the current sequence counter value identified by the INITIALIZE UPDATE command.

Incorporating the wipe scripts 42' in the specialized applet on the secure element may provide certain advantages. For example, it may be easier to delegate management of the wipe scripts to the respective TSM that owns or controls the secure element 32'. That is, these functions may be performed using existing authentication mechanisms that are already used at the secure element level, rather than having to include additional authentication mechanisms into the operating system of the mobile device 30', for example. This may also advantageously help facilitate implementation of the above-noted operations across different mobile device platforms (e.g., different types of mobile devices or mobile devices from different manufacturers). As noted above, this may also make it easier to ensure that the wipe scripts 42' remain intact if the rest of the mobile device (i.e., the memory 40') is wiped prior to wiping of the secure element 32'.

It should be noted that, in some embodiments, the mobile device 30' may include more than one secure element 32', and may communicate with more than one provisioning server 34'. In the case of multiple secure elements 32', each secure element may store or receive its own respective wipe scripts 42' and associated wipe script applet. As such, the contents of the different secure elements may be wiped separately or all together (e.g., as part of an overall device wipe). Furthermore, the respective contents of each secure element 32' may be wiped in whole or in part, depending on the given implementation, as noted above.

It should also be noted that while the above-described examples for wiping a secure memory are provided with reference to secure elements on NFC-enabled devices, the above-described techniques may be applicable to data management for other secure memory applications as well. That is, the use of wipe scripts, for example, may be applied to other secure memory applications to allow for data modification or deletion without a data connection to a secure provider, where such a data connection would otherwise be required to perform the data modification or deletion operations.

Example components of a mobile communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
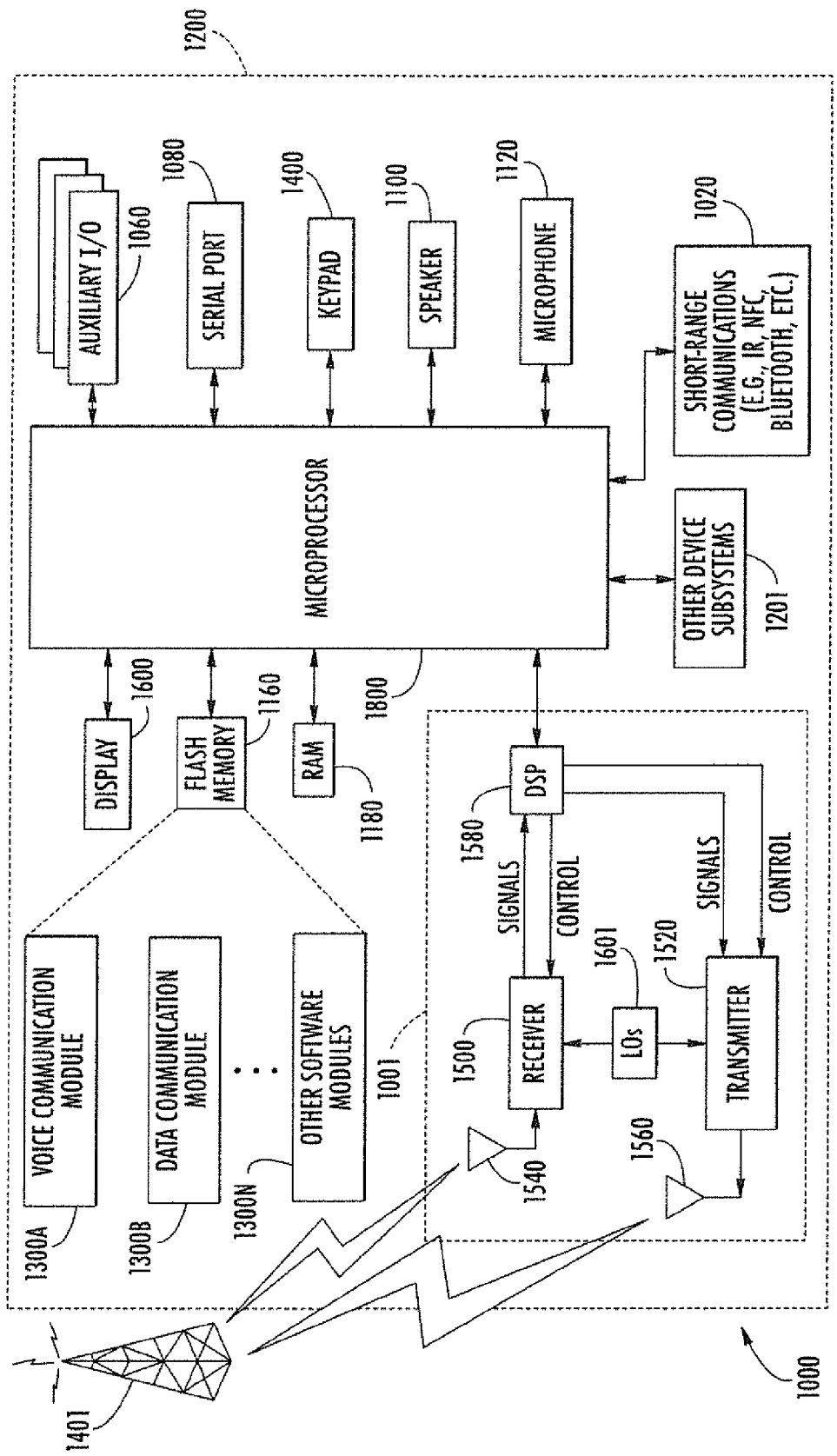
FIG. 6 is a schematic block diagram illustrating example mobile communications device components that may be used in accordance with an example embodiment.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) device (which may include an associated secure element) for communicating with another NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device comprising:
   a near field communications (NFC) device;
   an input device configured to generate a memory wipe command;

a secure element memory configured to install secure data from a trusted service manager (TSM) only during an over-the-air (OTA) secure channel connection with the TSM; and a secure element controller coupled with the NFC device, the input device, and the secure element memory, the secure element controller being configured to establish the secure channel OTA connection with the TSM and receive secure data from the TSM to install in the secure element memory, receive wiping instruction data from the TSM during the secure channel OTA connection with the TSM for wiping the secure data from the secure element memory, and wipe the secure data from the secure element memory at a later time without a secure channel OTA connection with the TSM based upon the memory wipe command and the received wiping instruction data.

2. The mobile communications device of claim 1 wherein the wiping instruction data comprises at least one wiping instruction script.

3. The mobile communications device of claim 2 wherein the secure element controller is configured to provide a plurality of sequence count values; and wherein the at least one wiping instruction script comprises a plurality of wiping instruction scripts each having a respective different sequence count value associated therewith.

4. The mobile communications device of claim 3 wherein the secure element controller is further configured to execute a respective wiping instruction script from among the plurality of wiping instruction scripts based upon a current sequence count value.

5. The mobile communications device of claim 1 wherein the secure element memory is divided into a plurality of secure partitions; and wherein the wiping instruction data is stored in a given one of the secure partitions.

6. The mobile communications device of claim 1 wherein the secure element memory comprises a Subscriber Identity Module (SIM) card.

7. The mobile communications device of claim 1 wherein the secure element memory comprises an embedded Universal Integrated Circuit Card (eUICC).

8. The mobile communications device of claim 1 wherein the secure element memory comprises a removable memory.

9. The mobile communications device of claim 1 wherein the secure element memory comprises a Secure Digital (SD) card.

10. The mobile communications device of claim 1 wherein the secure element memory comprises an embedded memory.

11. A communications method for a mobile wireless communications device comprising a secure element memory configured to install secure data from a trusted service manager (TSM) only during an over-the-air (OTA) secure channel connection with the TSM, a near field communications (NFC) device, and an input device configured to generate a memory wipe command, the method comprising:

establishing the secure channel OTA connection with the TSM and receiving secure data from the TSM and storing the secure data into the secure element memory;

receiving wiping instruction data from the TSM and storing the wiping instruction data into the secure element memory for wiping the secure data from the secure element memory; and wiping the secure data from the secure element memory at a later time without a secure channel OTA connection with the TSM based upon the memory wipe command and the wiping instruction data stored in the secure element memory.

12. The method of claim 11 wherein the wiping instruction data comprises at least one wiping instruction script.

13. The method of claim 12 further comprising providing a plurality of sequence count values; and wherein the at least one wiping instruction script comprises a plurality of wiping instruction scripts each having a respective different sequence count value associated therewith.

14. The method of claim 13 wherein wiping further comprises executing a respective wiping instruction script from among the plurality of wiping instruction scripts based upon a current sequence count value.

15. The method of claim 11 wherein the secure element memory is divided into a plurality of secure partitions; and wherein the wiping instruction data is stored in a given one of the secure partitions.

16. A non-transitory computer-readable medium for a mobile communications device comprising a secure element memory configured to install secure data from a trusted service manager (TSM) only during an over-the-air (OTA) secure channel connection with the TSM, a near field communications (NFC) device, and an input device configured to generate a memory wipe command, the non-transitory computer-readable medium having computer-executable instructions capable of causing the mobile communications device to perform steps comprising:

establishing the secure channel OTA connection with the TSM and receiving secure data from the TSM and storing the secure data into the secure element memory;

receiving wiping instruction data from the TSM and storing the wiping instruction data into the secure element memory for wiping the secure data from the secure element memory; and wiping the secure data from the secure element memory at a later time without a secure channel OTA connection with the TSM based upon the memory wipe command and the wiping instruction data stored in the memory.

17. The non-transitory computer-readable medium of claim 16 wherein the wiping instruction data comprises at least one wiping instruction script.

18. The non-transitory computer-readable medium of claim 17 further having computer-executable instructions for causing the mobile communications device to provide a plurality of sequence count values; and wherein the at least one wiping instruction script comprises a plurality of wiping instruction scripts each having a respective different sequence count value associated therewith.

19. The non-transitory computer-readable medium of claim 18 wherein wiping further comprises executing a respective wiping instruction script from among the plurality of wiping instruction scripts based upon a current sequence count value.

20. The non-transitory computer-readable medium of claim 16 wherein the secure element memory is divided into a plurality of secure partitions; and wherein the wiping instruction data is stored in a given one of the secure partitions.

* * * * *